(12) United States Patent  
Lan (10) Patent No.: US 10,369,763 B2  
(45) Date of Patent: Aug. 6, 2019

(54) SEGMENTED ACOUSTIC INSERT (71) Applicant: The Boeing Company, Chicago, IL (US)

(72) Inventor: Justin Honshune Lan, Bothell, WA (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 15/490,999

(22) Filed: Apr. 19, 2017

(65) Prior Publication Data

US 2018/0305034 A1  Oct. 25, 2018

(51) Int. Cl.
| | | |
|---|---|---|
| *B32B 3/12* | (2006.01) | |
| *G10K 11/172* | (2006.01) | |
| *F02C 7/045* | (2006.01) | |
| *B64D 33/02* | (2006.01) | |
| *F02K 1/82* | (2006.01) | |

(52) U.S. Cl.
CPC ............ *B32B 3/12* (2013.01); *B32B 2307/10* (2013.01); *B64D 2033/0206* (2013.01)

(58) Field of Classification Search
CPC .......... B64D 2033/0206; G10K 11/172; B32B 3/12; B32B 2307/10; B32B 2307/102; E04B 2001/748; F02C 7/045; F02C 7/04; F02K 1/827
See application file for complete search history.

(56) References Cited

U.S. PATENT DOCUMENTS

| | | | | |
|---|---|---|---|---|
| 3,769,767 A | * | 11/1973 | Scott | ........................ E04C 2/365 |
| | | | | 181/288 |
| 3,819,007 A | | 6/1974 | Wirt et al. | |
| 3,887,031 A | | 6/1975 | Wirt | |
| 3,952,831 A | * | 4/1976 | Bernard | ..................... B32B 3/12 |
| | | | | 181/292 |
| 5,445,861 A | | 8/1995 | Newton et al. | |
| 5,997,985 A | * | 12/1999 | Clarke | ....................... B32B 3/12 |
| | | | | 428/116 |
| 6,274,216 B1 | * | 8/2001 | Gonidec | .................... B32B 3/12 |
| | | | | 428/116 |
| 6,536,556 B2 | * | 3/2003 | Porte | ......................... B32B 3/12 |
| | | | | 181/284 |
| 7,510,052 B2 | | 3/2009 | Ayle | |
| 7,520,369 B2 | * | 4/2009 | Dravet | .................... B64D 29/00 |
| | | | | 181/284 |
| 8,047,329 B1 | | 11/2011 | Douglas et al. | |
| 8,408,358 B1 | * | 4/2013 | Hermiller | ................ F02K 1/827 |
| | | | | 181/229 |
| 8,607,924 B2 | * | 12/2013 | Ichihashi | .............. G10K 11/172 |
| | | | | 181/288 |
| 8,727,072 B2 | | 5/2014 | Ayle | |
| 8,997,923 B2 | * | 4/2015 | Ichihashi | ................... B32B 3/10 |
| | | | | 181/292 |
| 9,068,345 B2 | * | 6/2015 | Ichihashi | .................. E04B 1/84 |

(Continued)

FOREIGN PATENT DOCUMENTS

FR  2660787 B1 *  6/1996 ........... G10K 11/172

*Primary Examiner* — Edgardo San Martin
(74) *Attorney, Agent, or Firm* — Yee & Associates, P.C.

(57) ABSTRACT

An acoustic insert comprises a sleeve having a first end and a second end. The sleeve comprises segments between the first end and the second end. A first acoustic septum is placed within the sleeve at a first depth. A second acoustic septum placed within the sleeve at a second depth.

17 Claims, 6 Drawing Sheets

(56) References Cited

U.S. PATENT DOCUMENTS

| | | | |
|---|---|---|---|
| 9,127,452 B1 * | 9/2015 | Winfield | B32B 5/022 |
| 9,334,059 B1 * | 5/2016 | Jones | B64D 33/02 |
| 9,620,102 B1 * | 4/2017 | Ichihashi | B64D 33/02 |
| 9,862,166 B2 * | 1/2018 | Lopez | B32B 3/12 |
| 10,032,445 B1 * | 7/2018 | Linch | G10K 11/172 |
| 2009/0039539 A1 | 2/2009 | Emori et al. | |
| 2011/0151183 A1 | 6/2011 | Reller et al. | |
| 2016/0264231 A1 * | 9/2016 | Stache | B64C 1/40 |

* cited by examiner

SEGMENTED ACOUSTIC INSERT

BACKGROUND INFORMATION

1. Field

The present disclosure relates generally to acoustic inserts for aircraft applications. More specifically, the present disclosure relates to a segmented acoustic insert used for reducing noise in an aircraft structure.

2. Background

Some aircraft systems generate undesired levels of noise while in operation. Aircraft engines, for example, can produce noise levels that exceed noise regulations governing commercial aircraft. Aircraft manufacturers reduce this excess noise by using acoustic systems within the engine. These acoustic systems are sometimes referred to as acoustic treatments or liners.

Acoustic systems include one or more acoustic inserts. These acoustic inserts, often referred as septa, include thin materials with holes designed for noise attenuation over a range of frequencies. The materials are generally incorporated into a honeycomb core and the core is secured between two facesheets. One facesheet is porous and the other facesheet is non-porous.

Some currently used noise reduction approaches include bonding the thin material to two or more pieces of honeycomb prior to forming the aircraft structure, then cutting the core to form the part. The core is then secured to the two facesheets. These approaches produce excess waste and are relatively permanent once bonded. Additionally, the bond between the two honeycomb pieces and the material limits the strength of the structure. Structural integrity and noise attenuation performance may be further restricted due to the limited surface area used for bonding and potential for excess adhesive to flow into the core and septa material.

Other existing applications include septa positioned and bonded into each cell of the honeycomb. The honeycomb is then trimmed to form the desired aircraft structure. This trimming process results in manufacturing waste and increases the cost of the system.

Therefore, it would be desirable to have a method and apparatus that takes into account at least some of the issues discussed above, as well as other possible issues. For example, it would be desirable to have an acoustic septa insert with multiple layers of material tuned to various frequencies that is implemented after trimming of the aircraft structure.

SUMMARY

An illustrative embodiment of the present disclosure provides an acoustic insert comprising a sleeve having a first end and a second end. The sleeve comprises segments between the first end and the second end. A first acoustic septum is placed within the sleeve at a first depth. A second acoustic septum placed within the sleeve at a second depth.

Another illustrative embodiment of the present disclosure provides an aircraft structure comprising a first facesheet, a second facesheet opposite the first facesheet, a honeycomb core, and an acoustic insert. The honeycomb core has a first edge, a second edge, and a plurality of cells. The first edge of the honeycomb core touches the first facesheet and the second edge of the honeycomb core touches the second facesheet. The acoustic insert is positioned within a cell in the plurality of cells. The acoustic insert comprises a sleeve having segments between a first end and a second end of the sleeve, a first acoustic septum, and a second acoustic septum. The first acoustic septum is placed within the sleeve at a first depth. The second acoustic sleeve is placed within the sleeve at a second depth.

A further illustrative embodiment of the present disclosure provides a method for reducing noise in an aircraft. An acoustic insert is formed. The acoustic insert comprises a sleeve having segments between a first end and a second end of the sleeve, a first acoustic septum, and a second acoustic septum. The acoustic insert with the first acoustic septum is tuned to absorb a first range of frequencies. When the second acoustic septum is added, the acoustic insert is then tuned to absorb a second range of frequencies. The acoustic insert is positioned within a cell in a honeycomb core.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the manufacturing process for reducing noise in aircraft engines is often more expensive and time consuming than desired. Bonding acoustic material to the honeycomb core, then trimming the structure afterwards, creates unnecessary waste product. Additionally, bonding acoustic material into cells within the honeycomb core takes more time than desired. It would be desirable to have a faster, less expensive process for placing acoustic material into the honeycomb core.

The illustrative embodiments also recognize and take into account that repairing a damaged acoustic system is more difficult than desired. Oftentimes, with bonded systems, the entire system has to be removed and replaced when damaged. Therefore, it would be desirable to have an acoustic system where one or more cells could be repaired individually, without having to reform or replace a substantial portion of the structure. It also may be desirable to replace one portion of an acoustic system with material tuned to a different range of frequencies while keeping the rest of the acoustic system intact.

The illustrative embodiments further recognize and take into account that the use of adhesive materials within the honeycomb core affects its structural integrity and performance. For example, the strength of the structure may be decreased due to use of an adhesive. Adhesive material within the cells of the honeycomb core can decrease acoustic performance. It may be desirable to use an acoustic system that limits or substantially reduces the use of adhesives.

The disclosed embodiments relate to an acoustic system that can be used in a wide variety of applications for reducing noise in an aerospace structure. However, components described herein have an application to many systems in need of noise attenuation.

Figure 1:
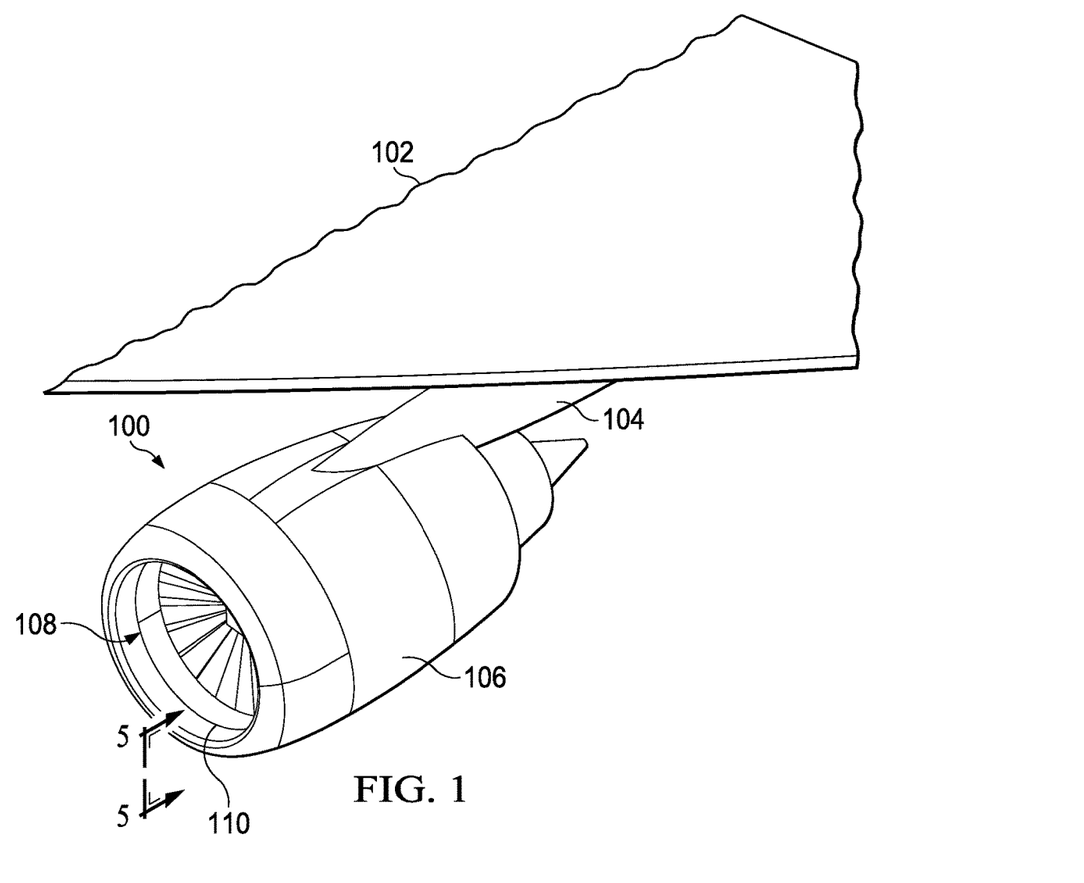
FIG. 1 is an illustration of a perspective view of a portion an aircraft showing an engine having an acoustic system in accordance with an illustrative embodiment.

With reference now to the figures, and in particular, with reference to FIG. 1, an illustration of a perspective view of a portion an aircraft showing an engine having an acoustic system is depicted in accordance with an illustrative embodiment. Engine 100 is mounted to wing 102 by pylon 104. Engine 100 is an aircraft engine in this illustrative example. In other illustrative examples, engine 100 may be an engine for another type of aerospace structure.

Engine 100 has nacelle 106 having inlet 108. Inlet 108 functions to direct airflow into engine 100. Inlet 108 includes acoustic system 110. Acoustic system 110 may be referred to as an "acoustically treated area" or an "acoustic liner" in some illustrative examples. Acoustic system 110 is configured to reduce noise caused by the engine's rotating blades that propagates through inlet 108 to the ground or airplane cabin.

Figure 2:
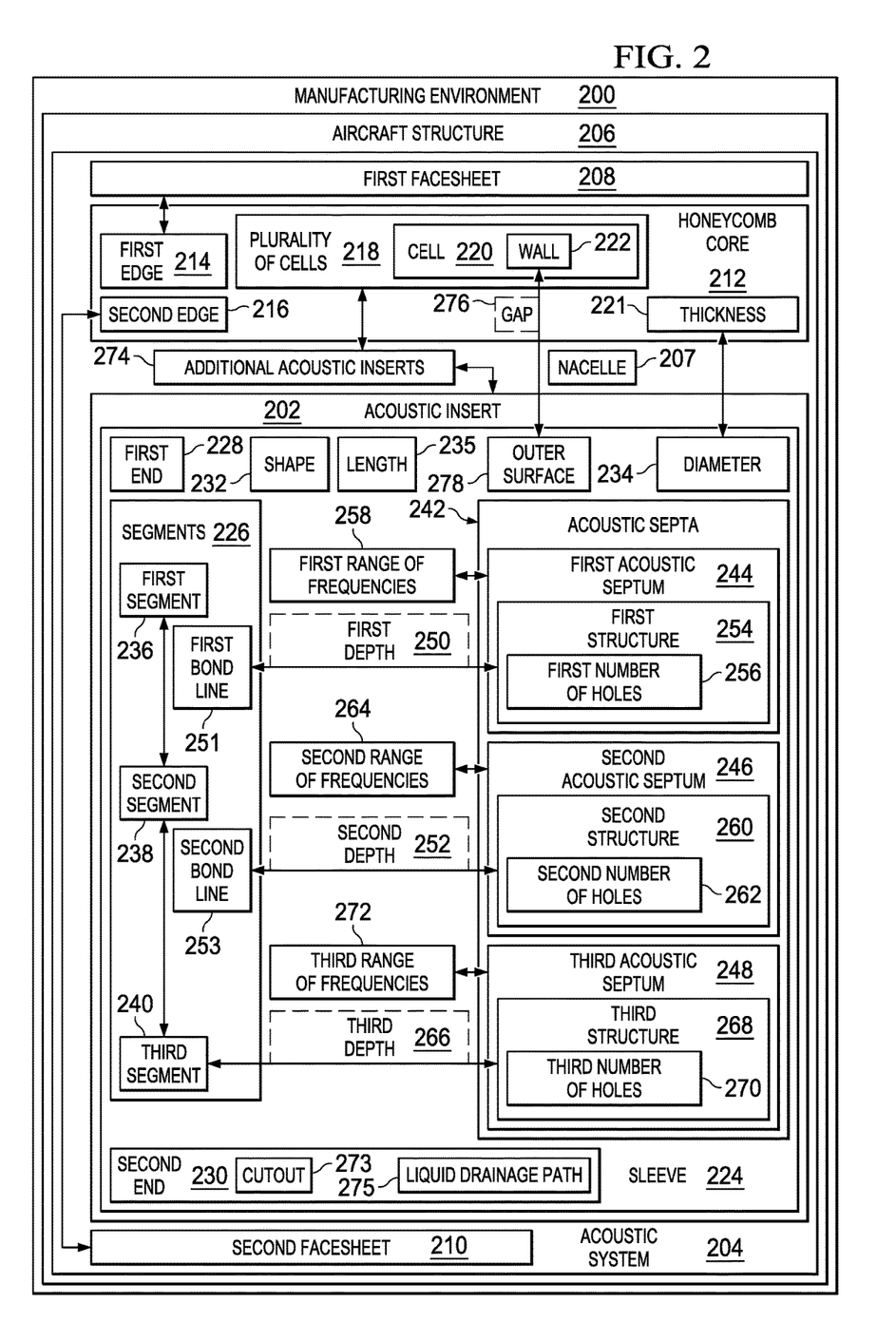
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where acoustic insert 202 may be manufactured for use in acoustic system 204. Acoustic system 204 may then be installed in aircraft structure 206. Alternatively, acoustic system 204 may be installed in aircraft structure 206 prior to acoustic insert 202 being added. Acoustic system 204 also may be known as an acoustic lining.

In an illustrative example, aircraft structure 206 may be any type of aerospace structure where reducing noise is desirable. Aircraft structure 206 may be in the interior or exterior of the aircraft. For example, without limitation, aircraft structure 206 may be an engine nacelle, an engine fan case, a thrust reverser, a muffler, a panel, a portion of the fuselage, or any other type of aerospace structure where acoustic system 204 may be used to reduce noise. In this illustrative example, aircraft structure 206 takes the form of nacelle 207.

Acoustic system 204 comprises first facesheet 208, second facesheet 210, honeycomb core 212, and acoustic insert 202. Second facesheet 210 is oriented opposite of first facesheet 208. First facesheet 208 and second facesheet 210 provide structural support for acoustic system 204.

First facesheet 208 and second facesheet 210 may be comprised of a material selected from at least one of a composite material, a metal, a plastic, a ceramic, or other suitable types of material. If first facesheet 208 or second facesheet 210 comprise a composite material, that material may be carbon fiber reinforced plastic (CRFP).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In this illustrative example, honeycomb core 212 has first edge 214, second edge 216, and plurality of cells 218. First edge 214 is opposite second edge 216. First edge 214 of honeycomb core 212 touches first facesheet 208. Second edge 216 of honeycomb core 212 touches second facesheet 210.

First facesheet 208 and second facesheet 210 may be bonded to first edge 214 and second edge 216 of honeycomb core 212, respectively. A number of these bonds may be a result of a process selected from at least one of ultrasonic welding, laser heating, infrared heating, application of adhesive material, or some other type of bonding process. As used herein, "a number of" when used with reference to items means one or more items. Thus, a number of bonds include one or more bonds.

Honeycomb core 212 is formed of plurality of cells 218. Plurality of cells 218 defines chambers in honeycomb core 212. Each cell in plurality of cells 218 may have a hexagonal shape. However, other cell geometries are possible. For example, without limitation, each cell in plurality of cells 218 may have a circular shape, a rectangular shape, a triangular shape, or some other suitable shape. Cell 220 is one of plurality of cells 218. Cell 220 has wall 222. Honeycomb core 212 may be comprised of a material selected from at least one of aluminum, a polymer, a metal, or other suitable types of materials.

Honeycomb core 212 has thickness 221. Thickness 221 is measured as the distance between first edge 214 and second edge 216 of honeycomb core 212. Thickness 221 may be selected to form the desired shape or functionality for acoustic insert 202.

As depicted in this example, acoustic insert 202 is positioned within cell 220 in plurality of cells 218. Acoustic insert 202 comprises sleeve 224 having segments 226 between first end 228 and second end 230 of sleeve 224. First end 228 is opposite second end 230 of sleeve 224.

Acoustic system 204 with acoustic insert 202 is configured to reduce noise in aircraft structure 206 by absorbing noise at various frequency ranges. Depending on how acoustic system 204 is designed, the bandwidth of frequencies absorbed may be altered as desired.

Acoustic insert 202 may be comprised of a material selected from at least one of a plastic, a metal, or some other suitable type of material. The material selected for acoustic insert 202 may affect the noise absorption properties of acoustic insert 202, depending on the functionality.

Sleeve 224 has shape 232, diameter 234, and length 235. Shape 232 may be the same over the entire length of sleeve 224. Shape 232 may be a circular shape, a rectangular shape, a hexagonal shape, a triangular shape, or some other suitable shape. In other illustrative examples, shape 232 may be wider or narrower at different parts of sleeve 224.

Diameter 234 of sleeve 224 may be configured to fit into cell 220 such that friction joins sleeve 224 to honeycomb core 212. In some illustrative examples, diameter 234 may be such that sleeve 224 moves slightly within cell 220 of honeycomb core 212.

Length 235 of sleeve 224 may be substantially the same as thickness 221 of honeycomb core 212 in this illustrative example. In some examples, length 235 of sleeve 224 may be less than thickness 221 of honeycomb core 212. Length 235 of sleeve 224 may affect the frequency response of acoustic insert 202. Length 235 of sleeve 224 may be designed to achieve a desired frequency response of acoustic insert 202.

In this illustrative example, segments 226 form sleeve 224. Segments 226 may be two segments, three segments, five segments, ten segments, or some other number of segments. Each of segments 226 may be the same length or different lengths. In this illustrative example, segments 226 include first segment 236, second segment 238, and third segment 240.

One segment in segments 226 may be secured or bonded to other segments in segments 226. For example, first segment 236 in segments 226 may be joined to second segment 238 in segments 226 by at least one of an adhesive, a welding material, ultrasonic welding, laser heating, infrared heating, friction, or other suitable processes. Similarly, third segment 240 may be joined to second segment 238 by the same or different processes.

Acoustic insert 202 also comprises acoustic septa 242. The number, shape, porosity, depth, and material of each septum in acoustic insert 202 affects the overall acoustic impedance of acoustic system 204. These parameters for acoustic septa 242 are configured to attenuate noise at a predetermined frequency range, or bandwidth.

For example, the depth selection of each acoustic septa 242 placed in acoustic insert 202 is the parameter that is used to tune the frequency range. The flow resistance (porosity) of each of acoustic septa 242 is the parameter that is tuned to achieve attenuation performance. In an illustrative example, each additional septa added to acoustic insert 202 broadens the range of frequencies that can be attenuated, therefore making acoustic system 204 more effective across a wider bandwidth and allowing acoustic insert 202 to attenuate noise of varying frequencies.

In this illustrative example, acoustic septa 242 include first acoustic septum 244, second acoustic septum 246, and third acoustic septum 248. In other illustrative examples, other numbers of septum may be present in acoustic septa 242.

First acoustic septum 244 may be placed within sleeve 224 at first depth 250. Second acoustic septum 246 may be placed within sleeve 224 at second depth 252. First depth 250 and second depth 252 may be selected to provide a desired level of acoustic impedance.

First acoustic septum 244 may be positioned at first bond line 251 between first segment 236 and second segment 238 in segments 226. Second acoustic septum 246 may be positioned at second bond line 253 between second segment 238 and third segment 240 in segments 226.

In this depicted example, first acoustic septum 244 comprises first structure 254 with first number of holes 256. Acoustic insert 202 with first acoustic septum 244 is tuned to absorb first range of frequencies 258. Selection of at least one of a size, a shape, a diameter, a material, or a number of holes in first structure 254 affects acoustic impedance of the structure.

First number of holes 256 is perforations in first structure 254. The porous material selected for first structure 254 may be configured to allow a portion of sound waves to pass through first structure 254, through cell 220, toward second acoustic septum 246.

Second acoustic septum 246 may be added to acoustic insert 202. In this illustrative example, second acoustic septum 246 comprises second structure 260 with second number of holes 262. Acoustic insert 202 with second acoustic septum 246 now may absorb second range of frequencies 264. The addition of second acoustic septum 246 broadens the range of frequencies that acoustic insert 202, and thereby acoustic system 204, is tuned to. After passing through first structure 254 in first acoustic septum 244, sound waves pass through second structure 260 in second acoustic septum 246. In this manner, acoustic insert 202 attenuates noise over a range of frequencies.

Sound waves may continue through sleeve 224 in cell 220 to reach third acoustic septum 248. Third acoustic septum 248 may be placed within sleeve 224 at third depth 266. Third acoustic septum 248 may comprise third structure 268 with third number of holes 270. The addition of third acoustic septum 248 allows acoustic insert 202 to be tuned to third range of frequencies 272. Third range of frequencies 272 is broader than the first range and the second range.

First structure 254 for first acoustic septum 244, second structure 260 for second acoustic septum 246, and third structure 268 for third acoustic septum 248 may be comprised of a number of materials selected from at least one of a porous metal, a plastic, a ceramic, a felt, or a composite. Desired porosity can be achieved through mechanical perforation, laser perforation, weaving, sintering, nonwoven needled felt, or use of some other suitable material.

Additional acoustic septa 242 may be added to sleeve 224 at different depths to further reduce noise at various frequency ranges. In the different depicted examples, a number of additional acoustic inserts 274 may be present in acoustic system 204. Each of additional acoustic inserts 274 may be positioned in a different cell in plurality of cells 218 in honeycomb core 212.

The number of acoustic septa 242 used in each of additional acoustic inserts 274 may be the same or may be different. For instance, one cell in plurality of cells 218 may have a sleeve comprising two acoustic septa, while another cell in plurality of cells 218 may have a sleeve comprising three acoustic septa. As another example, some cells in plurality of cells 218 may have a sleeve while other cells do not. The number of segments, sleeves, and acoustic septa, may be tailored for each application, manufacturing process, or repair.

In some illustrative examples, acoustic insert 202 may have cutout 273 at second end 230 of sleeve 224. Cutout 273 may be configured to provide liquid drainage path 275 to sleeve 224. Liquid drainage path 275 is configured to allow water to flow out of honeycomb core 212 to avoid damage to various structures in acoustic system 204. Cutout 273 may have different shapes, depending on the application.

When sleeve 224 is placed in cell 220, gap 276 may be present between outer surface 278 of sleeve 224 and wall 222 of cell 220. Gap 276 may allow sound waves to pass through cell 220.

In some illustrative examples, sleeve 224 may be bonded to wall 222 of cell 220. If sleeve 224 is bonded to wall 222 of cell 220, an adhesive material or other joining process may be used.

In other illustrative examples, sleeve 224 is not bonded to honeycomb core 212 in any manner. In such a case, manufacturing and assembly time is significantly decreased. For example, a robotic system can quickly insert each sleeve into each cell of honeycomb core 212 without the extra step of adding adhesive. Additionally, in an illustrative example, excess adhesive or uncontrolled application of an adhesive will not degrade the performance of acoustic insert 202 by clogging holes, filling gaps, or affecting the structural integrity of the core.

The illustrative examples provide an acoustic system that can be easily and quickly modified for any application. Additionally, if a portion of aircraft structure 206 is damaged in operation, repairs can be completed on one or more of plurality of cells 218 of honeycomb core 212. For instance, since an adhesive application is not required, damaged acoustic inserts can be replaced with new acoustic inserts without replacing the entirety of the honeycomb. In the same manner, the functionality of acoustic system 204 may be changed by replacing sleeves and thus, attenuating different frequency ranges, without destroying or replacing the part.

Acoustic system 204 as a whole may be configured to achieve desired acoustic impedance by adjusting any number of variables. For instance, components in acoustic system 204 may be altered. These components include, for example, without limitation, thickness 221 of honeycomb core 212, porosity or one or more septa, the number of septa within acoustic insert 202, the depth of each septa placed within honeycomb core 212, the material of the septa, or other variables. The illustrative embodiments are designed to have a certain bandwidth or range of frequencies (tuning frequencies) where acoustic system 204 has a desired performance. A desired attenuation is achieved at the tuning frequencies by designing the flow resistance (porosity) to achieve the desired acoustic impedance. The desired acoustic impedance depends on the application. For instance, the desired acoustic impedance may be different for an inlet as compared to a thrust reverser.

With an illustrative embodiment, the acoustic aspects of acoustic system 204 are completely decoupled from the structural aspects of acoustic system 204. In this way, acoustic systems can be tailored in any manner and with any functionality desired. Acoustic inserts can be mass produced and quickly positioned within honeycomb core 212. Acoustic inserts may be placed in the system before, during, or after aircraft structure 206 is trimmed. As a result, trimming waste may be reduced.

Figure 3:
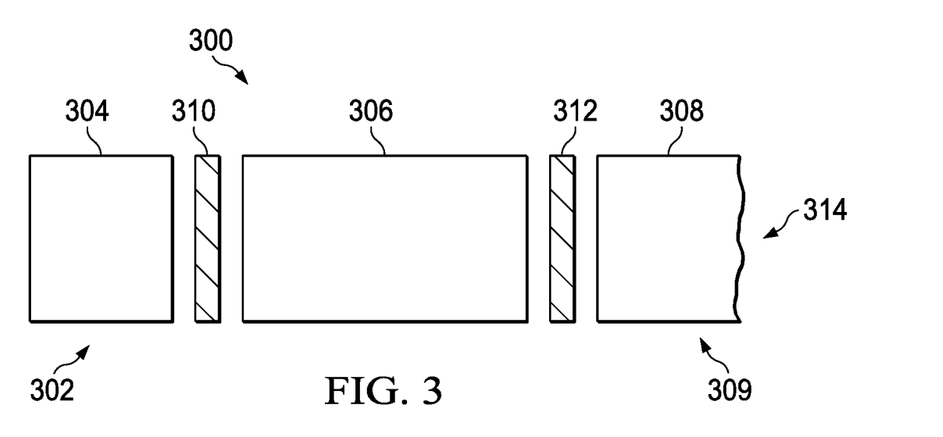
FIG. 3 is an illustration of pieces of an acoustic septum insert in accordance with an illustrative embodiment.

With reference next to FIG. 3, an illustration of pieces of an acoustic septum insert is depicted in accordance with an illustrative embodiment. FIG. 3 depicts an example of one implementation for acoustic insert 202 in FIG. 2.

As depicted, acoustic insert 300 has segments 302. Segments 302 include segment 304, segment 306, and segment 308. Segment 304, segment 306, and segment 308 in segments 302 are illustrative examples of implementations for first segment 236, second segment 238, and third segment 240 in segments 226 in FIG. 2, respectively. Segments 302 form sleeve 309 of acoustic insert 300.

Acoustic insert 300 also includes acoustic septum 310 and acoustic septum 312. Acoustic septum 310 and acoustic septum 312 are examples of implementations for first acoustic septum 244 and second acoustic septum 246 shown in FIG. 2. Acoustic septum 310 and acoustic septum 312 may be configured to reduce noise at a desired frequency range in this illustrative example.

Segment 308 has cutout 314. Cutout 314 is configured to provide a liquid drainage path for acoustic insert 300. Although cutout 314 is shown in this particular configuration, any number of configurations is possible.

Figure 4:
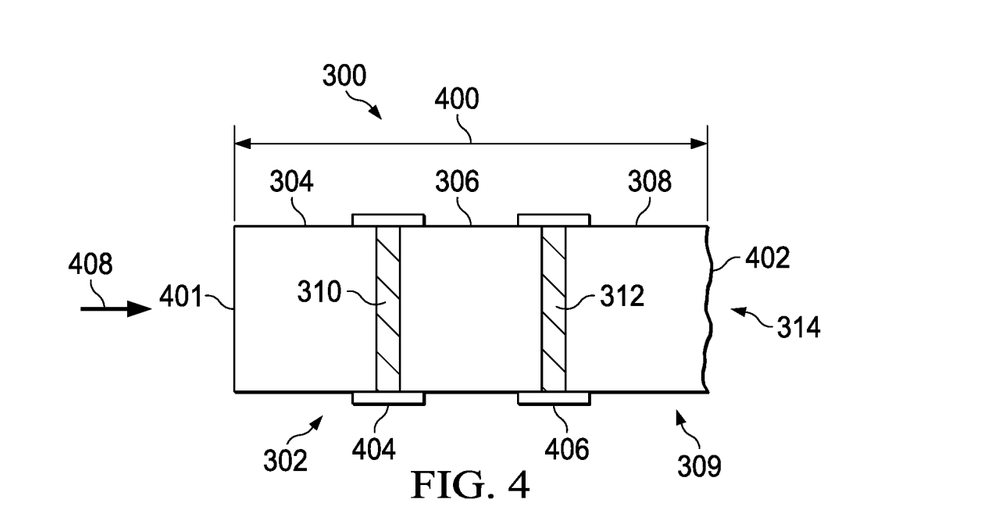
FIG. 4 is an illustration of a bonded acoustic insert in accordance with an illustrative embodiment.

Turning next to FIG. 4, an illustration of a bonded acoustic insert is depicted in accordance with an illustrative embodiment. The items depicted in FIG. 3 have now been bonded together. Bonded acoustic insert 300 has length 400.

As shown in this figure, sleeve 309 has end 401 and end 402. When acoustic insert 300 is installed in a honeycomb core, sleeve 309 will run parallel to the chambers in the honeycomb core and between two facesheets. End 401 will be positioned perpendicular to one facesheet of the acoustic system, while end 402 will be positioned perpendicular to the opposite facesheet. At least one of end 401 and end 402 may touch the facesheets or a gap may be present.

In this illustrative example, segment 304 and segment 306 are joined at bond line 404. Segment 306 and segment 308 are joined at bond line 406. Acoustic septum 310 is also joined to segment 306 and segment 308 at bond line 404. Acoustic septum 312 is joined to segment 306 and segment 308 at bond line 406. Bond line 404 and bond line 406 are illustrative examples of one implementation for first bond line 251 and second bond line 253, respectively, shown in block form in FIG. 2.

When acoustic insert 300 is installed in an aircraft structure, sound waves flow through sleeve 309 in the direction of arrow 408. Noise is reduced as it passes through acoustic septum 310, and then further reduced as it passes through acoustic septum 312.

Although bonded acoustic insert 300 is depicted having a uniform shape, other shapes and configurations are possible. For instance, one or more of segments 302 may be wider or narrower, or have varying shapes.

Bonded acoustic insert 300 may be mass produced and subsequently inserted into a honeycomb core. The positioning process may occur before the part is trimmed, or afterwards.

Figure 5:
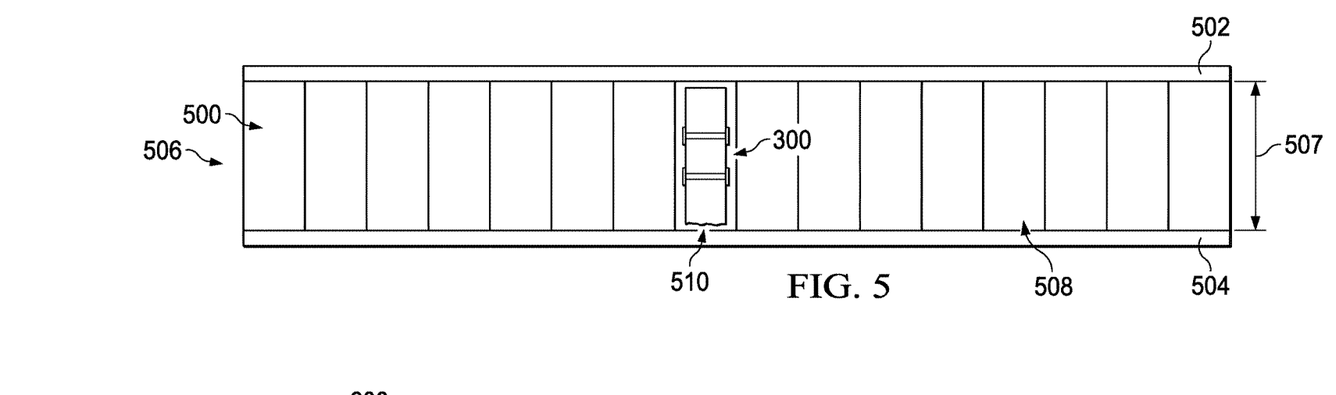
FIG. 5 is an illustration of a cross-sectional view of an acoustic insert inside a honeycomb core in accordance with an illustrative embodiment.

Next, in FIG. 5, an illustration of a cross-sectional view of an acoustic insert inside a honeycomb core is depicted in accordance with an illustrative embodiment. The cross-section is taken along lines 5-5 in FIG. 1. Bonded acoustic insert 300 from FIG. 4 has been inserted into honeycomb core 500 in this illustrative example.

Acoustic insert 300, honeycomb core 500, facesheet 502, and facesheet 504 form acoustic system 506. The components in acoustic system 506 are illustrative examples of the components in acoustic system 204 shown in block form in FIG. 2.

As depicted, honeycomb core 500 has thickness 507. Thickness 507 may be substantially the same as length 400 of sleeve 309 shown in FIG. 4. Honeycomb core 500 includes cells 508. Bonded acoustic insert 300 has been inserted into cell 510 of honeycomb core 500 in this illustrative example. In other examples, a number of additional cells in cells 508 may contain an acoustic insert similar to acoustic insert 300.

Figure 6:
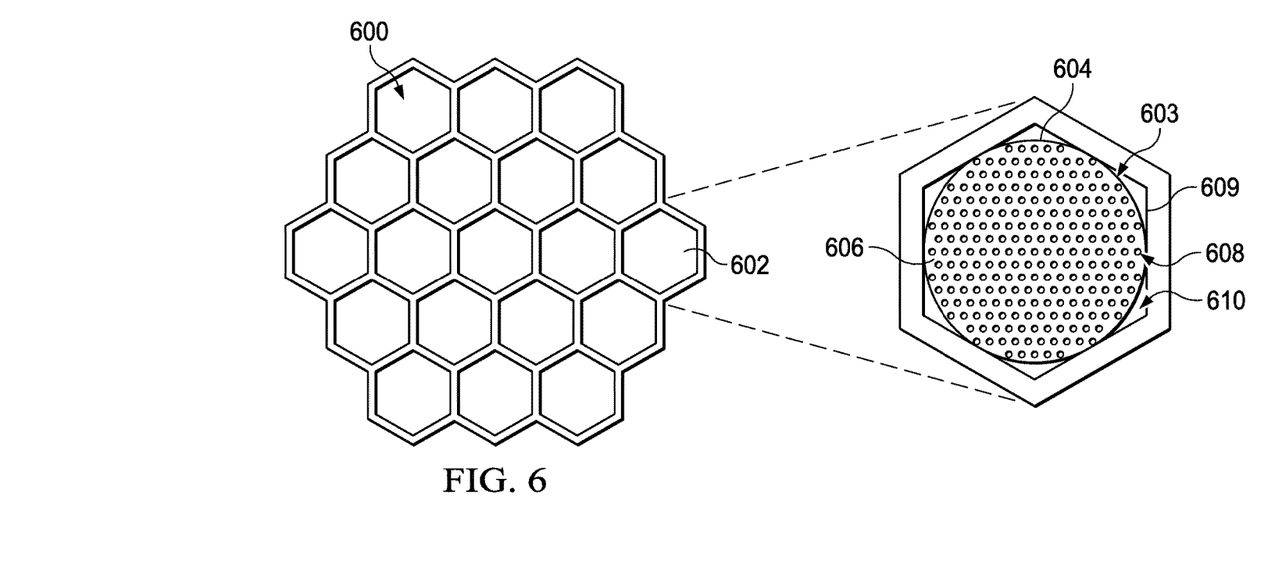
FIG. 6 is an illustration of a top view of an acoustic insert in a honeycomb core in accordance with an illustrative embodiment.

Turning now to FIG. 6, an illustration of a top view of an acoustic insert in a honeycomb core is depicted in accordance with an illustrative embodiment (no facesheet shown). Honeycomb core 600 has cell 602.

Acoustic insert 603 has been positioned within cell 602. Acoustic septum 604 is seen in this view. Acoustic septum 604 is made of porous material 606 with perforations 608.

Walls 609 of cell 602 have a hexagonal shape, while acoustic insert 603 has a cylindrical shape in this illustrative example. As a result, gap 610 is present between walls 609 of honeycomb core 600 and acoustic insert 603. Other shapes and configurations of walls 609 of cell 602, acoustic insert 603, or both are possible in various illustrative examples.

Different acoustic systems may be used in each portion of an aircraft structure. For example, different configurations for acoustic linings may be used in different sections within nacelle 106 of engine 100 shown in FIG. 1. Acoustic inserts may be absent in an engine fan case, for example, while an engine inlet might have acoustic inserts in each cell in the honeycomb core.

Different thicknesses of core, depths of acoustic septa, and lengths of sleeves may be used to reach desired noise reduction. Materials may be selected based on structural integrity concerns, temperature conditions, or other desired functionality for an acoustic system. In this manner, an illustrative embodiment may be versatile in its application, inexpensively produced, and quickly assembled.

Engine 100 in FIG. 1 is only one physical implementation of a platform incorporating acoustic insert 202 in FIG. 2. Although the examples for an illustrative embodiment are described with respect to an aircraft, an illustrative embodiment may be applied to other types of platforms. Acoustic insert 202 may be used in any platform where noise reduction is desired. The platform may be, for example, a mobile platform, a stationary platform, a land-based structure, an aquatic-based structure, or a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 1 and FIGS. 3-6 may be combined with components in FIG. 2, used with components in FIG. 2, or a combination of the two. Additionally, some of the components in FIG. 1 and FIGS. 3-6 may be illustrative examples of how components shown in block form in FIG. 2 may be implemented as physical structures.

Figure 7:
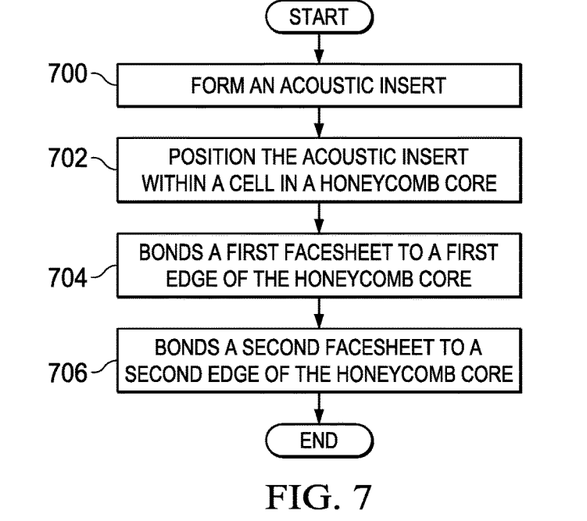
FIG. 7 is an illustration of a flowchart of a process for reducing noise in an aircraft in accordance with an illustrative embodiment.

Turning now to FIG. 7, an illustration of a flowchart of a process for reducing noise in an aircraft is depicted in accordance with an illustrative embodiment. The method depicted in FIG. 7 may be used to assemble acoustic system 204 shown in FIG. 2. The method reduces noise while the aircraft is in operation.

The process begins by forming an acoustic insert (operation 700). The acoustic insert comprises a sleeve having segments, a first acoustic septum, and a second acoustic septum. The segments are located between a first end and a second end of the sleeve. The acoustic structure with the first acoustic septum is tuned to absorb a first range of frequencies. The addition of the second acoustic septum broadens the range of frequencies that can be absorbed by the acoustic insert.

Next, the process positions the acoustic insert within a cell in a honeycomb core (operation 702). In some examples, the acoustic insert is not bonded to the honeycomb core. In other examples, the honeycomb core is formed as part of the process described herein. Operation 702 may occur after the honeycomb core is completely formed, trimmed, or both.

The process then bonds a first facesheet to a first edge of the honeycomb core (operation 704). A second facesheet is then bonded to a second edge of the honeycomb core (operation 706) with the process terminating thereafter. The acoustic insert is now positioned within the cell between the first facesheet and the second facesheet.

Figure 8:
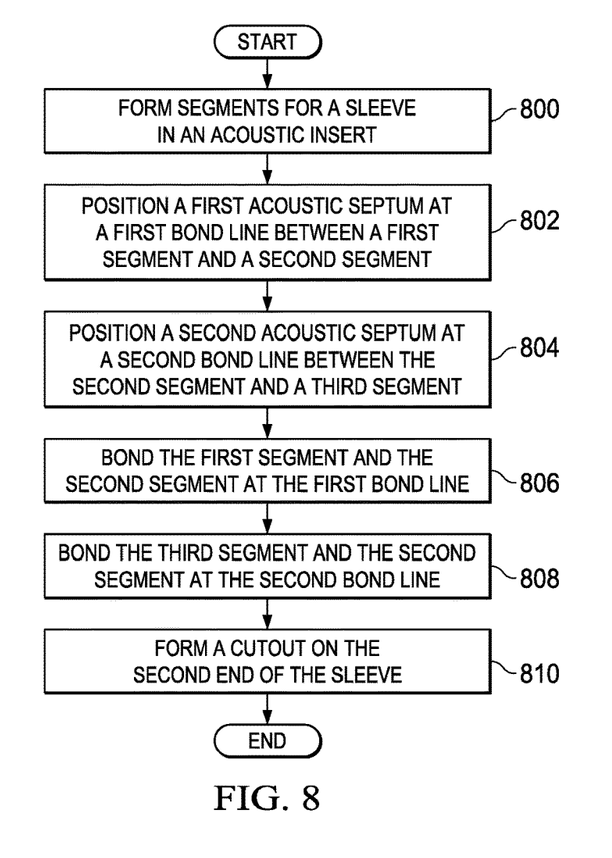
FIG. 8 is an illustration of a flowchart of a process for forming an acoustic insert in accordance with an illustrative embodiment.

In FIG. 8, an illustration of a flowchart of a process for forming an acoustic insert is depicted in accordance with an illustrative embodiment. The method depicted in FIG. 8 may be used during operation 700 shown in FIG. 7 to form acoustic insert 202 shown in FIG. 2.

The process begins by forming segments for a sleeve in an acoustic insert (operation 800). Operation 800 may include casting material on a die, extruding the material, cutting the material, applying a protective coating on the material, or any number of other processes. During operation 800, a shape is selected for the sleeve such that a diameter of the sleeve fits within the cell and a gap is formed between a wall of the cell and the outer surface of the sleeve. In this illustrative example, the sleeve has three segments.

Next, a first acoustic septum is positioned at a first bond line between a first segment and a second segment in the segments (operation 802). A second acoustic septum is then positioned at a second bond line between the second segment and a third segment (operation 804).

The process then bonds the first segment and the second segment at the first bond line (operation 806). The third segment is bonded to the second segment at the second bond line (operation 808).

Optionally, a cutout is formed on the second end of the sleeve (operation 810), with the process terminating thereafter. The cutout is configured to provide a liquid drainage path to the sleeve. The process depicted in FIG. 8 may be repeated to form as many acoustic inserts as desired.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 9:
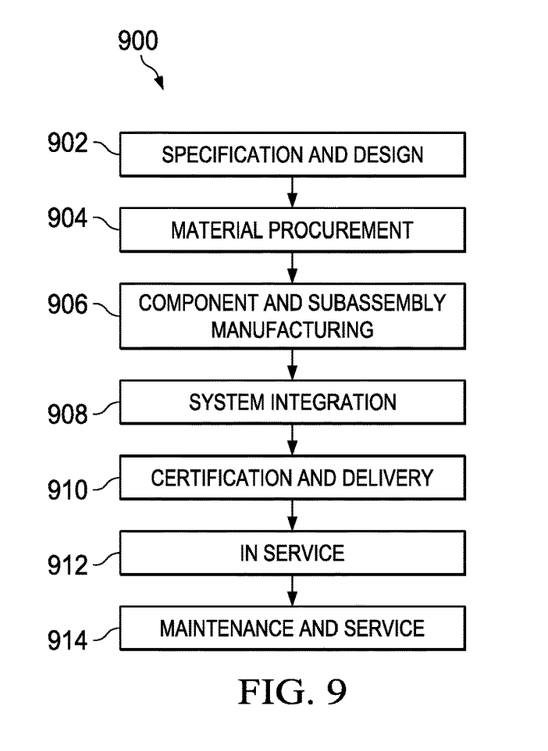
FIG. 9 is an illustration of a block diagram of an aircraft manufacturing and service method in accordance with an illustrative embodiment.
Figure 10:
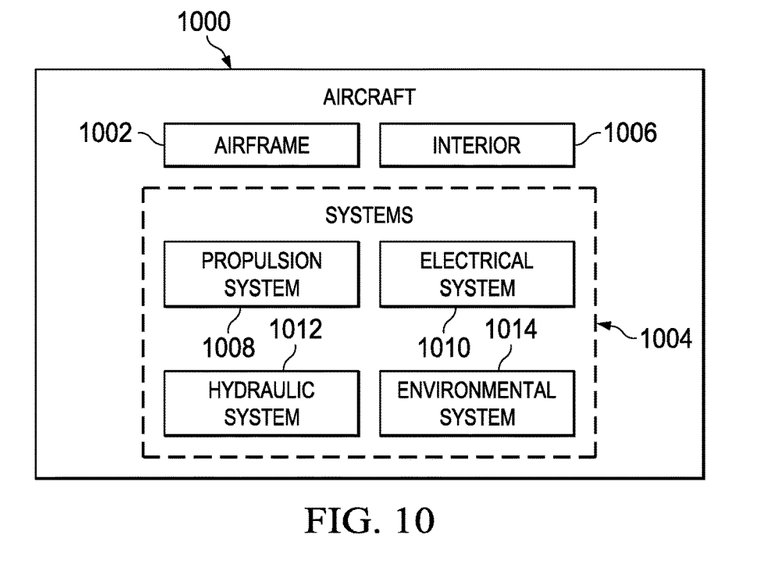
FIG. 10 is an illustration of a block diagram of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During preproduction, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Acoustic system 204 from FIG. 2 and the components within acoustic system 204 may be made during component and subassembly manufacturing 906. In addition, acoustic insert 202 may be used in parts made for routine maintenance and service 914 as part of a modification, reconfiguration, or refurbishment of aircraft 1000.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a block diagram of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The illustrative embodiments describe a method for reducing noise in an aircraft. An aircraft is operated. The noise generated by the aircraft while operating the aircraft is reduced using an acoustic insert having a sleeve, a first acoustic septum is placed within the sleeve at a first depth, and a second acoustic septum is placed within the sleeve at a second depth. The acoustic insert having the first acoustic septum is tuned to absorb a first range of frequencies. The addition of the second acoustic septum allows for the acoustic insert to absorb a second range of frequencies.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An acoustic insert comprising:
    a sleeve having a first end and a second end, the sleeve comprising segments between the first end and the second end;
    a first acoustic septum placed within the sleeve at a first depth; and
    a second acoustic septum placed within the sleeve at a second depth;
    wherein a first segment in the segments is joined to a second segment in the segments by at least one of an adhesive, a welding material, ultrasonic welding, laser heating, infrared heating, and friction.

2. The acoustic insert of claim 1, wherein the first acoustic septum comprises a first structure with a first number of holes such that the acoustic insert absorbs noise at a first range of frequencies.

3. The acoustic insert of claim 2, wherein the second acoustic septum comprises a second structure with a second number of holes such that the acoustic insert absorbs noise at a second range of frequencies.

4. The acoustic insert of claim 3, wherein the first acoustic septum is positioned at a first bond line between the first segment and the second segment in the segments.

5. The acoustic insert of claim 4, wherein the second acoustic septum is positioned at a second bond line between the second segment and a third segment in the segments.

6. The acoustic insert of claim 3 further comprising:
    a third acoustic septum placed within the sleeve at a third depth, the third acoustic septum comprising a third structure with a third number of holes such that the acoustic insert absorbs noise at a third range of frequencies.

7. The acoustic insert of claim 1 further comprising:
    a honeycomb core having a plurality of cells, wherein the sleeve is positioned within a cell in the plurality of cells.

8. The acoustic insert of claim 7 further comprising:
    a gap between an outer surface of the sleeve and a wall of the cell.

9. The acoustic insert of claim 1 further comprising:
    a cutout at the second end of the sleeve configured to provide a liquid drainage path to the sleeve.

10. An aircraft structure comprising:
    a first facesheet;
    a second facesheet opposite the first facesheet;
    a honeycomb core having a first edge, a second edge, and a plurality of cells, wherein the first edge of the honeycomb core touches the first facesheet, and the second edge of the honeycomb core touches the second facesheet;
    an acoustic insert positioned within a cell in the plurality of cells, the acoustic insert comprising a sleeve having segments between a first end and a second end of the sleeve, a first acoustic septum placed within the sleeve at a first depth, and a second acoustic septum placed within the sleeve at a second depth; and a gap between an outer surface of the sleeve and a wall of the cell.

11. The aircraft structure of claim 10 further comprising:
a cutout at the second end of the sleeve configured to provide a liquid drainage path to the sleeve.

12. The aircraft structure of claim 10, wherein the first acoustic septum is positioned at a first bond line between a first segment and a second segment in the segments, and the first acoustic septum comprises a first structure with a first number of holes such that the acoustic insert is tuned to absorb a first range of frequencies.

13. The aircraft structure of claim 12, wherein the second acoustic septum is positioned at a second bond line between the second segment and a third segment in the segments, and the second acoustic septum comprises a second structure with a second number of holes such that the acoustic insert is tuned to absorb a second range of frequencies.

14. The aircraft structure of claim 10, wherein the sleeve is not bonded to the honeycomb core.

15. A method for reducing noise in an aircraft, the method comprising:
forming an acoustic insert comprising a sleeve having segments between a first end and a second end of the sleeve, a first acoustic septum, and a second acoustic septum, wherein the acoustic insert is configured to absorb a range of frequencies and wherein forming the acoustic insert comprises bonding a first segment and a second segment in the segments and bonding a third segment and the second segment in the segments; and
positioning the acoustic insert within a cell in a honeycomb core.

16. The method of claim 15 further comprising:
positioning the first acoustic septum at a first bond line between the first segment and the second segment; and
positioning the second acoustic septum at a second bond line between the second segment and the third segment.

17. The method of claim 15 further comprising:
bonding a first facesheet to a first edge of the honeycomb core; and
bonding a second facesheet to a second edge of the honeycomb core such that the acoustic insert is positioned within the cell between the first facesheet and the second facesheet, wherein the acoustic insert is not bonded to the honeycomb core.

* * * * *